Patented Sept. 14, 1954

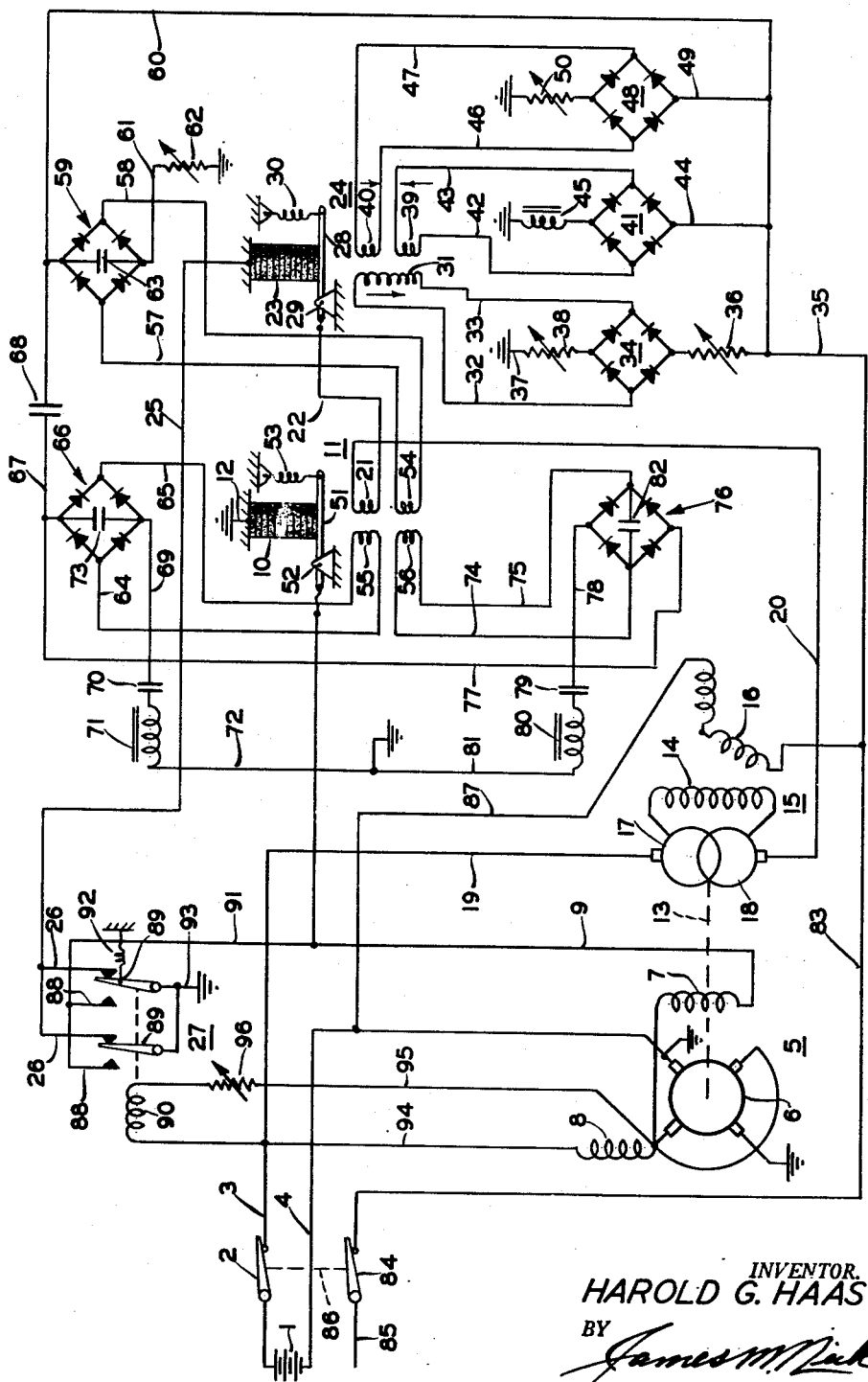

2,689,326

UNITED STATES PATENT OFFICE 2,689,326

DYNAMOELECTRIC MACHINE CONTROL SYSTEM

Harold G. Haas, Fair Haven, N. J., assignor to Bendix Aviation Corporation, Eatontown, N. J., a corporation of Delaware Application September 26, 1952, Serial No. 311,637

4 Claims. (Cl. 322—24)

The present invention relates to motor generators or inverters and more particularly to a control and regulating system for motor generators or inverters.

In motor generators or inverters that have a motor operating from an external power supply, driving a generator there is a tendency for voltage to increase with increase in speed. Heretofore, it has been difficult to maintain regulation within desired limits.

Also, in starting it has been found that arcing of the brushes occurs due to the inrush peak current.

The present invention provides a system in which rising frequency causes a drop in voltage and a decrease in frequency causes an increase in voltage. A self-regulating action is obtained that tends to hold a fixed voltage and frequency setting.

Also, a greater time delay in the starting circuit provides a longer starting time with full shunt motor field thereby reducing the duration of the inrush peak current and a corresponding reduction in the arcing at the brushes. During the starting cycle the frequency regulator is rendered inoperative.

It is an object of the invention to provide novel and improved inverter circuits.

Another object of the invention is to provide novel and improved voltage regulation for an inverter.

Another object of the invention is to provide an improved voltage regulator circuit.

Another object of the invention is to provide novel and improved starting circuits for an inverter.

Another object of the invention is to provide novel means for regulating a dynamoelectric machine.

Another object of the invention is to provide novel means for reducing the inrush peak current in starting a dynamoelectric machine.

The above and other objects and features of the invention will appear more fully hereinafter from a consideration of the following description taken in connection with the accompanying drawing wherein one embodiment of the invention is illustrated by way of example.

In the drawing:

The single figure is a diagrammatic showing of a system embodying the invention.

Referring to the drawing, there is provided a source of direct current which, for the purpose of illustration, is shown as a battery 1, which is connected through switch 2, conductors 3 and 4 to a motor indicated generally by the numeral 5. The switch 2 is illustrated as being manually controlled. It is understood, however, that it may be controlled in any other conventional manner. The motor 5 has an armature 6, shunt field winding 7 and series field winding 8.

One end of the series field winding 8 is connected to the conductor 3 while the other end of the winding 8 is connected to the positive terminal of the motor 5. One end of the shunt field winding 7 is connected to the positive terminal of the motor 5 while the other end of the winding 7 is connected by a conductor 9 to one end of a variable resistance element 10 of a frequency regulator indicated generally by the numeral 11. The other end of the element 10 is connected by a conductor 12 to ground.

The motor 5 drives, through a shaft diagrammatically represented by the dashed line 13, an exciting winding 14 of an alternating current generator indicated generally by the numeral 15 and having a stator winding 16. While a single phase generator has been illustrated by way of example, it is understood that the generator may be multi-phase as well.

The exciting winding 14 is connected to slip rings 17 and 18. The ring 17 is connected by conductor 19 to the load side of the switch 2, while the ring 18 is connected by conductor 20 to one side of winding 21 of the frequency regulator 11, the function of which will be explained later. The other end of the winding 21 is connected by a conductor 22 to one end of a variable resistance or carbon pile element 23 of a voltage regulator indicated generally by the numeral 24. The opposite end of the carbon pile element 23 is connected by a conductor 25 to a pair of contact members 26 of a relay 27, the operation of which will be explained later.

The voltage regulator 24 is shown diagrammatically as including an armature 28 pivoted at 29 and biased under tension of a spring 30 in a direction tending to decrease the resistance of the pile 23 and thereby increasing the energization of the exciting winding 14 so as to effect an increase in the voltage output of the generator 15.

A main electromagnetic winding 31 biases the armature 28 in a direction opposing the spring 30 tending to increase the resistance of the carbon pile 23 so as to decrease the energization of the exciting winding 14 and thereby decrease the output voltage of the generator 15. The winding 31 is connected by conductors 32 and 33 across the output of rectifier 34. The input of the rectifier 34 is connected across the stator winding 16 by conductor 35, resistor 36 and ground connection 37. The ground connection 37 may include a resistor 38.

In addition to the winding 31, the regulator 24 has windings 39 and 40. The winding 39 is connected across the output of rectifier 41 by conductors 42 and 43. One input terminal of the rectifier 41 is connected to the conductor 35 by a conductor 44. The other input terminal of the rectifier 41 is connected to ground through a saturable inductance 45. The winding 40 is connected by conductors 46 and 47 across the output of rectifier 48. One input terminal of the rectifier 48 is connected by a conductor 49 to the conductor 35 and the other input terminal is connected through resistor 50 to ground. The windings 39 and 40 are wound on a common core with the same number of turns and connected to be opposing.

The frequency regulator 11 is shown diagrammatically as including an armature 51, pivoted at 52 and biased under the tension of a spring 53 in a direction tending to decrease the resistance of the carbon pile element 10. Electromagnetic windings 54, 55, 56 and the winding 21 coact to bias the armature 51 in a direction tending to increase the resistance of the pile 10 so as to decrease the energization of the winding 7.

The main control winding 54 is connected by conductors 57 and 58 across the output of rectifier 59. One input terminal of the rectifier 59 is connected by a conductor 60 to the conductor 35 and the other input terminal is connected by a conductor 61 to ground. A variable resistance 62 may be inserted in the conductor 61 for adjustment of the regulator 11. A capacitor 63 may be connected across the input terminals of the rectifier 59.

The winding 55 is connected by conductors 64 and 65 across the output of rectifier 66. One input terminal is connected by a conductor 67 to the conductor 60. A capacitor 68 may be inserted in the conductor to limit the voltage applied to the rectifier 66. The other input terminal of the rectifier 66 is connected by conductor 69, capacitor 70, inductance 71 and conductor 72 to ground. The capacitor 70 and inductance 71 are proportioned to form a series resonant circuit that is resonant at a frequency slightly lower than the predetermined operating frequency. A capacitor 73 may be connected across the input of the rectifier 66.

The winding 56 is connected by conductors 74 and 75 across the output of a rectifier 76. One input terminal of the rectifier 76 is connected by a conductor 77 to the conductor 67 and the other input terminal is connected by conductor 78, capacitor 79, inductance 80 and conductor 81 to ground.

A capacitor 82 may be connected across the input of the rectifier 76. The capacitor 79 and inductance 80 form a circuit that is adjusted to resonate at a frequency slightly above the predetermined operating frequency. The windings 55 and 56 are opposing and are proportioned to be equal at the operating frequency. A shift in frequency from the operating frequency will cause the windings 55 and 56 to provide a push-pull effect in a direction depending upon the direction of the shift to return to the operating frequency.

One end of the winding 16 is connected by conductor 83 to one side of a switch 84 which controls the connection of the generator 15 to a load bus 85. The switch 84 may be interconnected with the switch 2 for operation therewith as indicated by the dashed line 86. The other end of the winding 16 is connected by a conductor 87 to the ground wire 4. Conductor 87 could also be brought out ungrounded for systems where ungrounded A. C. power is desired.

In addition to the contacts 26, the relay 27 has a pair of contacts 88, movable switch members 89 and a control winding 90. The contacts 88 are connected by a conductor 91 to the conductor 9. The switch members 89 are normally biased, such as by spring 92, into engagement with the contacts 26. The switch members 89 are connected by a conductor 93 to ground. The control winding 90, adapted when energized to actuate the switch members 89 into engagement with the contacts 88, is connected by conductors 94 and 95 across the series field winding 8. A variable resistance 96 may be inserted in the conductor 95 to adjust the tripping value of the winding 90.

In operation upon closure of the switches 2 and 84 the winding 90 is energized sufficiently by the inrush starting current to actuate the switch members 89 into engagement with the contacts 88 thus opening the A. C. field circuit and short circuiting the frequency regulator. Upon the inrush starting current decaying to a value slightly greater than rated full load current, for example 150 per cent of the rated full load current, the switch members 89 will be released by the winding 90 and will be actuated into engagement with the contacts 26. This closes the A. C. field circuit and removes the short circuit from the frequency regulator variable resistance.

A self-regulating action is obtained that will tend to hold a fixed voltage and frequency setting by providing the voltage regulator with three control windings. The main winding 31 is connected to sense output voltage. The winding 39 is connected in opposition to the winding 31 and is energized from the output voltage through a circuit having inductance 45. The inductance 45 is proportioned to saturate in the range of the predetermined voltage. The effective ampere turns of the inductance 45 increase as the frequency drops from the predetermined frequency and decrease as the frequency rises above the predetermined frequency. The amplification of the current in the winding 39 due to saturation in the working range of voltage greatly increases the sensitivity of the regulator 24. The winding 40 is substantially similar to the winding 39 and is connected in opposition thereto. The winding 40 provides temperature compensation in that it is wound in parallel with the winding 39, is of the same size wire and has the same number of turns. Temperature changes effect the windings 39 and 40 the same amount and hence cancel out the effects thereof. The resistor 50 permits adjustment of the current in the winding 40 so that at the regulated voltage it is equal to the current in the winding 39.

Although only one embodiment of the invention has been illustrated and described, various changes in the form and relative arrangement of the parts, which will now appear to those skilled in the art, may be made without departing from the scope of the invention.

What is claimed is:

1. A control apparatus for use in a system having an alternating current generator driven by an electric motor, comprising frequency regulating means responsive to the output frequency of said generator for controlling the speed of said motor, voltage regulating means including a main control winding responsive to generator voltage and a pair of auxiliary control windings, one of said auxiliary windings being responsive to output frequency to oppose said main winding upon an increase in frequency, the other of said auxiliary windings being responsive to output voltage and wound in opposition to said first auxiliary winding.

2. The combination as described in claim 1 and including means responsive to inrush starting current in said motor to short circuit said frequency regulating means and open the circuit to said voltage regulating means.

3. A voltage regulator for an alternating current generator having an exciting winding, comprising a variable resistance element for varying the energization of said exciting winding, a main control winding for said resistance element, said main winding being connected to be responsive to the output voltage of said generator, a pair of auxiliary control windings, said auxiliary windings being substantially similar and wound in opposition on a common core, one of said windings being energized in accordance with the output frequency of said generator to oppose said main winding upon an increase in frequency, the other of said windings being energized in accordance with the output voltage of said generator.

4. A regulator for controlling the output voltage of an alternating current generator, comprising a carbon pile resistance element, a main control winding and a pair of auxiliary control windings, first circuit means for connecting said main winding across the output of said generator, second circuit means including a saturable inductance for connecting one of said auxiliary windings in opposing relationship to said main winding across the output of said generator, third circuit means for connecting the other of said windings in aiding relationship to said main winding across the output of said generator, and means for adjusting the energization of one of said auxiliary windings so that the energization of said auxiliary windings is equal and opposing at a predetermined output voltage.

References Cited in the file of this patent

UNITED STATES PATENTS

| Number | Name | Date |
|---|---|---|
| 2,329,195 | Grabau | Sept. 14, 1943 |
| 2,492,527 | Haas | Dec. 27, 1949 |